United States Patent [19]

Hatakeyama

[11] 4,360,329
[45] Nov. 23, 1982

[54] METHOD OF MANUFACTURING A DECORATED FORMING ARTICLE AND THE ARTICLE THEREBY FORMED

[76] Inventor: Yoshiharu Hatakeyama, 5-29-10, Tachibana, Sumidaku, Tokyo, Japan

[21] Appl. No.: 311,903

[22] Filed: Oct. 15, 1981

Related U.S. Application Data

[62] Division of Ser. No. 112,726, Jan. 17, 1980.

[30] Foreign Application Priority Data

Jun. 20, 1979 [JP] Japan ................................. 54-76885
Dec. 3, 1979 [JP] Japan ............................... 54-166103

[51] Int. Cl.³ .............................................. B29C 6/00
[52] U.S. Cl. ................................ 425/112; 425/126 R; 425/129 R
[58] Field of Search ....................... 264/132, 247, 509; 425/112, 126 R, 127, 128, 129 R

[56] References Cited

U.S. PATENT DOCUMENTS

3,270,101 8/1966 Jardine et al. ................... 264/247 X
3,768,942 10/1973 Langecker ....................... 425/126 R Primary Examiner—J. Howard Flint, Jr.
Attorney, Agent, or Firm—Fleit & Jacobson

[57] ABSTRACT

This invention relates to a method of decorating the surface of an article made of synthetic resin and a metal mold for decoration of the article thereby formed. More particularly, it relates to a method of manufacturing a decorated article and a metal mold for its formation characterized by: heating an endless like transfer foil fed endless-like into a metal mold; spraying hot air from an injection mold of said metal mold together with leading said heated transfer foil into the metal mold with a surface which decorates said article through an adhesive layer facing the injection mold; sticking said transfer foil to the inner circumference wall surface of said metal mold by applying suction to the transfer foil with a pouring mold; a given forming article by injection of a synthetic resin from the injection mold after closing the injection mold and the pouring mold completely; peeling off the article from the base film of said transfer foil when said article is removed from said metal mold; and only transfering the printing layer of the transfer foil to the outer surface of the forming article.

4 Claims, 7 Drawing Figures

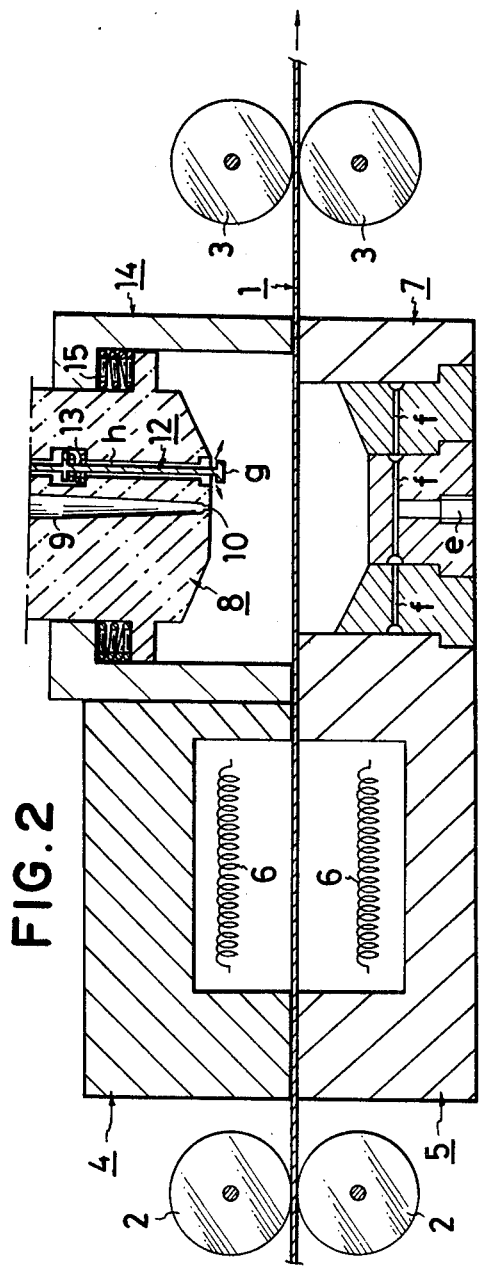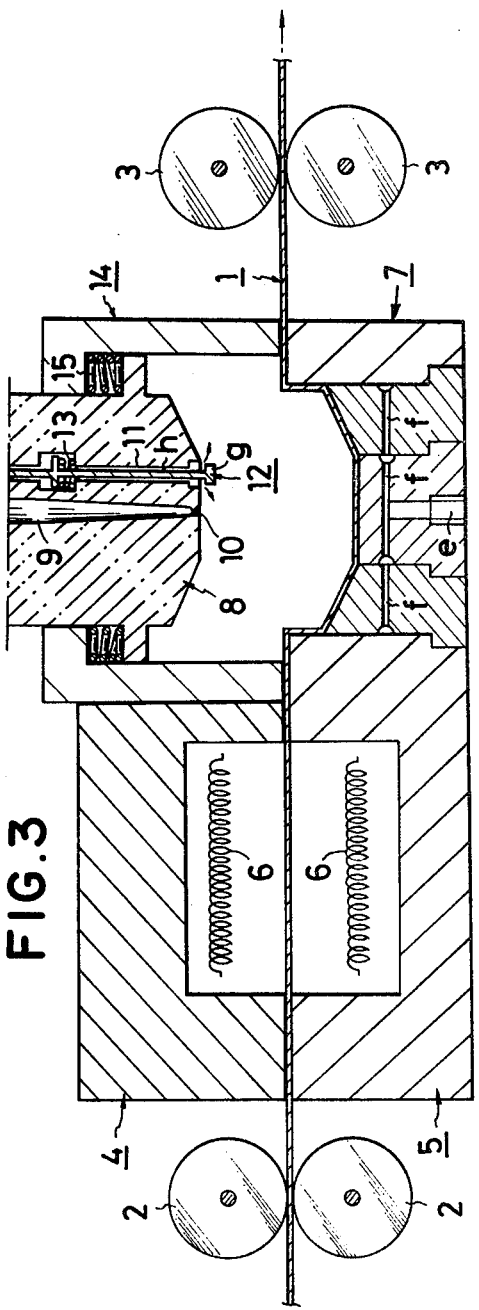

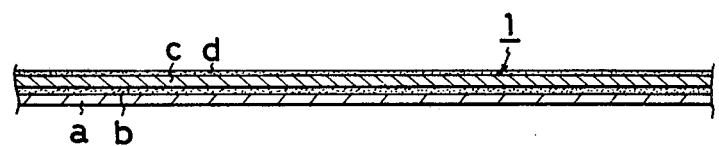
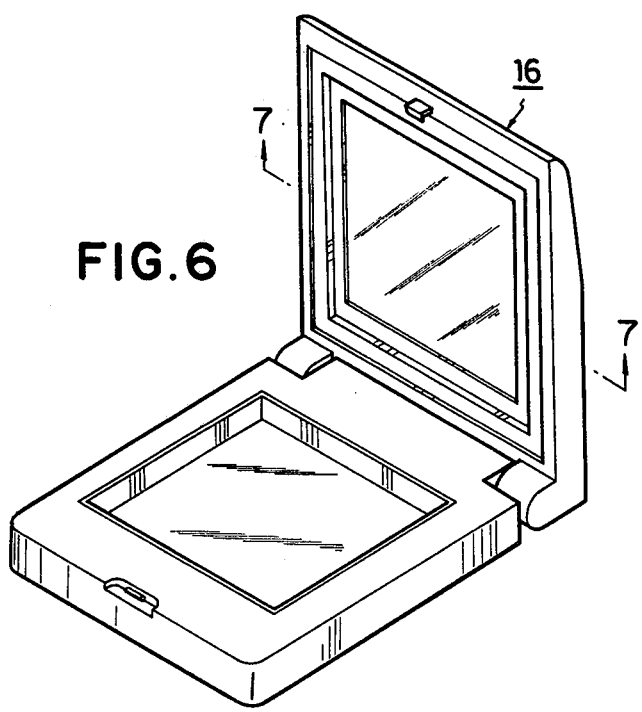
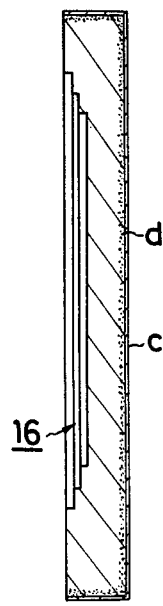

METHOD OF MANUFACTURING A DECORATED FORMING ARTICLE AND THE ARTICLE THEREBY FORMED

This is a divisional of application Ser. No. 112,726 filed Jan. 17, 1980.

BACKGROUND OF THE INVENTION

It is known to decorate the surface of a forming article made of synthetic resin using transfer technique. However, it is difficult, in the conventional method, to apply this technique to such article having a deep inner surface or a large size in length as a dish or a cup. Further, it is also difficult to transfer to a cubically formed surface having a complicated concave, convex or spherical surface, etc., supplying a transfer paper smoothly and adhering it.

BRIEF DESCRIPTION OF THE DRAWING

FIG. 1 to FIG. 4 are cross-sectional views of the metal mold which explain the practical steps of the method according to this invention in the order the steps are performed.

FIG. 5 is a cross-sectional view of the transfer foil used in this invention.

FIG. 6 is a perspective view of the product formed by this invention.

FIG. 7 is a cross-sectional view taken along lines 7—7 of FIG. 6.

DETAILED DESCRIPTION OF THE DRAWINGS

Figure 1:
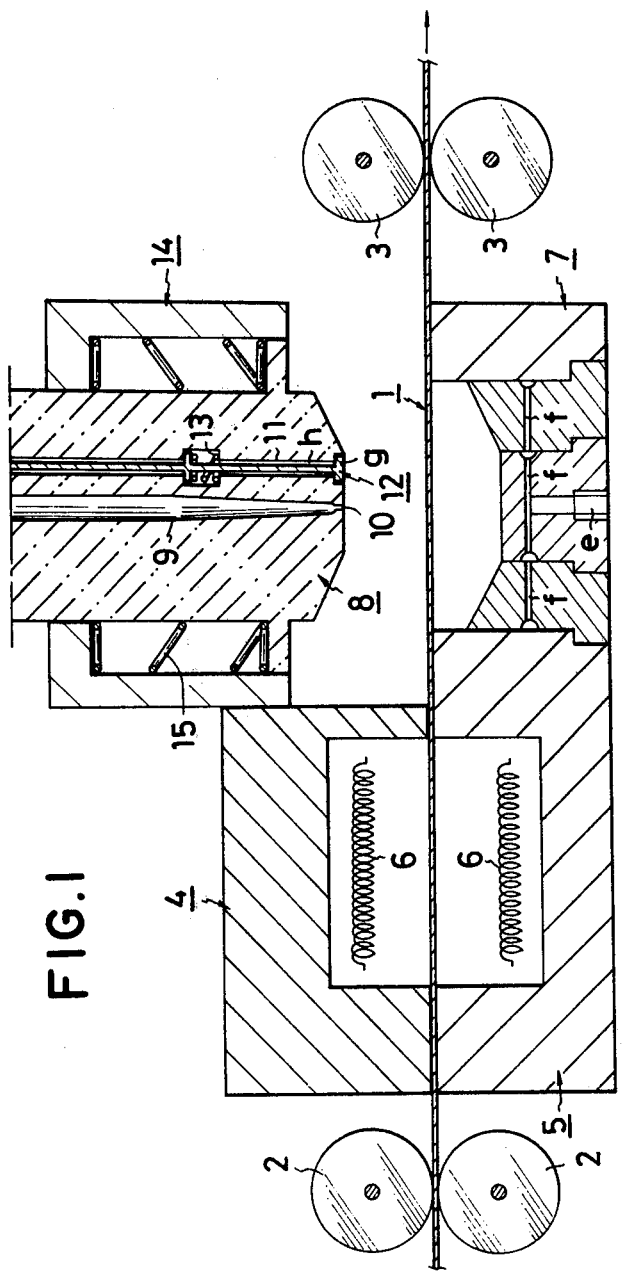
Figure 4:
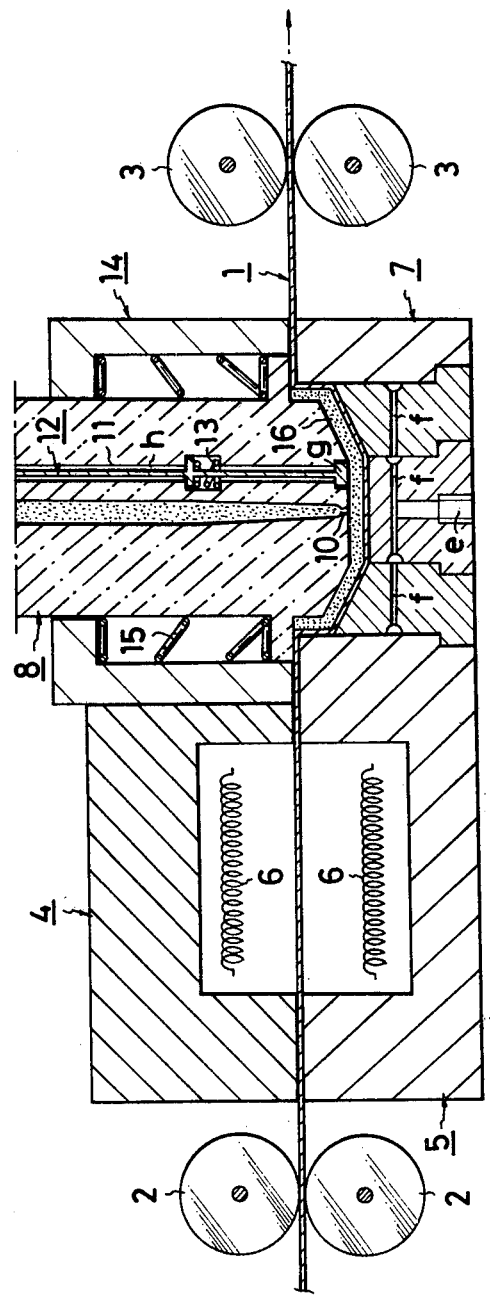

Referring to the drawings of an embodiment of the method and the metal mold according to this invention, in FIG. 1 to FIG. 5, the numeral 1 is an endless-like transfer foil formed by laminating a base film a, a mold lubricant layer b, a printing layer c, an adhesive layer d, etc. in order, said transfer foil being fed intermittently into said metal mold by means of front and rear driving rollers 2 and 3. The numerals 4 and 5 are preheat apparatuses having heaters 6 in each inner part, respectively, which are arranged in parallel in front of the aftermentioned metal mold, to heat both sides of the transfer foil 1.

The numeral 7 is the pouring mold of the metal mold its inner part is divided into a plurality of blocks provided with a hole e and grooves f for applying a vacuum therein so that the air may be withdrawn from slight clearances at jointed surfaces of each block. The numeral 8 is an injection mold corresponding to the pouring mold 7. The injection mold 8 has in its central portion a runner 9 and a sprue 10 and further a pin hole 11 in parallel with said runner 9 and sprue 10 at the side of them. The numeral 12 is a pin inserted into said pin hole 11. The pin 12 has at the lower end thereof a bottom plate g having a shape able to close a lower end of said pin hole 11 completely a plurality of grooves h are formed to ventilate the air around said pin 12. Further, the pin 12 is biased upwards by a spring 13 to close the pin hole 11. The bottom plate g is moved to open the lower end of pin hole 11 by introducing air from the upper part of the pin hole 11 so that the air may be sprayed into the mold from pin hole 11 as shown in FIG. 2 and FIG. 3. The numeral 14 is an outer frame provided independently from the injection mold so as to be able to descend and ascend around said injection mold, and springs 15 are intervened between said injection mold 8 and said outer frame 14. When said outer frame 14 descends, the frame contacts the pouring mold 7 whereby the transfer foil 1 is grasped by the lower surface of the outer frame 14 and the upper surface of the pouring mold 7.

Referring to the method in accordance with this invention, both surfaces of the foil 1 fed by driving rollers 2 are heated to a certain temperature with preheat apparatuses 4 and 5. Then, when the foil goes into the forming mold, the outer frame 14 descends to fix said foil 1 at a certain position with respect to the pouring mold 7. The foil 1 grasped by the outer frame 14 and the pouring mold 7 is caused to slacken by means of spraying hot air from the pin hole 11 of said injection mold 8 by applying a vacuum from the hole e and the grooves f of said pouring mold 7 and to adhere to the wall surface of the inner circumference of pouring mold 7 as shown in FIG. 3. The pin hole 11 is then closed by the pin 12 and the pouring mold 7 completely joined with the injection mold 8 by lowering said injection mold into the position illustrated in FIG. 4. A desired article 16 is formed in a space between the injection and the pouring molds by injecting a synthetic resin from the runner 9 and the sprue 10. Then the metal mold is opened by raising said injection mold 8 and said outer frame 14, respectively, and the foil 1 is exfoliated from the article 16 after removing said article therefrom. Then the adhesive layer d and the printing layer c laminated to the base film a of the foil 1 are transferred to the inner and the outer surfaces of the article 16. Thus, a beautiful picture can be decorated on the surface of the article 16 having a great inner surface depth and a great outer height. It is needless to say that the same article can be obtained even if the structure of the injection mold and the pouring mold are reversed.

In the method according to this invention as described above, the foil fed into the metal mold is caused to slacken toward the pouring mold using hot air sprayed from the injection mold, together with previously preheating the transfer foil fed to the metal mold so as to have the foil soft and then the foil is drawn by the vacuum operation into the pouring mold so that the foil conforms closely to the inner circumference of the wall. Therefore, even if the pouring mold has a conspicuous unevenness at its inner wall surface, the foil correctly fits the surface. Thus, mass production is possible because of the capability of continuously decorating the surface of an article having a great inner depth or a great outer surface height such as a dish or a cup without creases in the foil as seen in the conventional method, and decoration with pictures can be performed by transferring print patterns having a high accuracy. further, the pin holes from which hot air can be sprayed out are provided in the injection mold and said each pin hole is so perfectly closed with a pin at the time of forming that there is no fear of inflow of the resin into this part from the surface of the article being formed. Similarly, in the pouring mold the air is removed from the connecting surfaces of a plurality of blocks. Accordingly, there is no fear of inflow of the transfer foil or the resin into this part such as in the conventional vacuum, making it possible to form an article having a smooth surface.

I claim:

1. In a metal mold consisting of an injection mold and a pouring mold, said metal mold comprises inserting a pin into a pin hole ascendably and descendably together with providing a pin hole from which the hot wind can be sprayed out there through into an injection mold, and providing a hole or groove for vacuum at a bottom of the pouring mold.

2. A metal mold which comprises providing a preheat apparatus capable of preheating the transfer foil at the front of said metal mold.

3. In a metal mold having an injection mold and a pouring mold, the improvement comprising providing said injection mold with a pin hole having a pin associated therewith, said pin being movable upward and downward to close and open the pin hole, said injection mold being adapted to spray hot air out of said pin hole when said pin hole is open, said pouring mold having an opening and grooves for applying vacuum to the bottom of the pouring mold.

4. The metal mold of claim 3, in which said metal mold further includes a preheat apparatus capable of preheating a transfer foil upstream of the metal mold.

* * * * *